US009882831B2

(12) United States Patent
Smirnov

(10) Patent No.: US 9,882,831 B2
(45) Date of Patent: Jan. 30, 2018

(54) MAXIMIZING BANDWIDTH UTILIZATION IN NETWORKS WITH HIGH LATENCIES AND PACKET DROPS USING TRANSMISSION CONTROL PROTOCOL

(75) Inventor: Vadim Smirnov, Kaliningrad (RU)

(73) Assignee: Mainline Net Holdings Limited, Road Town, VI (US)

( * ) Notice: Subject to any disclaimer, the term of this patent is extended or adjusted under 35 U.S.C. 154(b) by 1074 days.

(21) Appl. No.: 13/144,926

(22) PCT Filed: Oct. 21, 2009

(86) PCT No.: PCT/IB2009/054659
§ 371 (c)(1),
(2), (4) Date: Feb. 7, 2014

(87) PCT Pub. No.: WO2010/082091
PCT Pub. Date: Jul. 22, 2010

(65) Prior Publication Data
US 2014/0192639 A1    Jul. 10, 2014

Related U.S. Application Data

(60) Provisional application No. 61/145,505, filed on Jan. 16, 2009.

(51) Int. Cl.
*H04L 12/927* (2013.01)
*H04L 12/801* (2013.01)
(Continued)

(52) U.S. Cl.
CPC .............. *H04L 47/80* (2013.01); *H04L 47/10* (2013.01); *H04L 47/12* (2013.01); *H04L 47/127* (2013.01);
(Continued)

(58) Field of Classification Search
CPC ....... H04L 47/10; H04L 69/16; H04L 47/193; H04L 69/163; H04L 47/27
See application file for complete search history.

(56) References Cited

U.S. PATENT DOCUMENTS 6,754,228 B1    6/2004 Ludwig
2003/0174700 A1    9/2003 Ofek et al.
(Continued)

OTHER PUBLICATIONS

Ryo Yamamoto, Takumi Miyoshi, Flow Control Method Using Round Trip Time on Ad Hoc Networks, The Institute of Electronics, Information and Communication Engineers, 2008.

*Primary Examiner* — Jung Park
(74) *Attorney, Agent, or Firm* — Avery N. Goldstein; Blue Filament Law PLLC

(57) ABSTRACT

Disclosed is a method of maximizing the utilization of currently available network path bandwidth by TCP transmissions. Embodiments of the present invention allow to automatically detect and utilize a larger portion of the currently available bandwidth (or even the entire bandwidth) for every specific connection and network path that utilizes the invention. Furthermore, some embodiments of the present invention provide that the software implementing the technology may be running only at the data sender side and may communicate with a standard receiver. According to embodiments of the present invention, the software implementing the invention may be placed between a TCP/IP protocol driver and a Network Interface driver. Such intermediate software may hide the real network state from TCP/IP driver and shift the TCP connection SWND edge by means of Preemptive Spoof Data Acknowledgment and Packet Loss Concealment.

37 Claims, 10 Drawing Sheets

(Incoming packet processing algorithm and data flow)

(51) Int. Cl.
*H04L 12/807* (2013.01)
*H04L 12/841* (2013.01)
*H04L 29/06* (2006.01)

(52) U.S. Cl.
CPC ............ *H04L 47/193* (2013.01); *H04L 47/27* (2013.01); *H04L 47/283* (2013.01); *H04L 69/16* (2013.01)

(56) References Cited

U.S. PATENT DOCUMENTS

| | | | |
|---|---|---|---|
| 2005/0226150 A1* | 10/2005 | Santos | H04L 47/10 370/230 |
| 2007/0008884 A1 | 1/2007 | Tang | |
| 2007/0280115 A1* | 12/2007 | Meyer | H04L 47/10 370/236 |
| 2016/0036712 A1* | 2/2016 | Weston | H04L 69/163 370/236 |

\* cited by examiner

Fig. 1 (Extreme TCP deployment technique, architecture and data flow)

Fig. 2 (Processing subsystem architecture, control and data flow)

Fig. 3 (Packet association algorithm and data flow)

Fig. 4 (Connection entity creation algorithm and data flow)

Fig. 5 (Outgoing packet processing algorithm and data flow)

Fig. 6 (Incoming packet processing algorithm and data flow)

Fig. 7 (Transmission algorithm and data flow)

Fig. 8 (Retransmission with TO check and PLC algorithm and data flow)

Fig. 9 (Extreme TCP SWND adjustment algorithm)

MAXIMIZING BANDWIDTH UTILIZATION IN NETWORKS WITH HIGH LATENCIES AND PACKET DROPS USING TRANSMISSION CONTROL PROTOCOL

RELATED APPLICATIONS AND PRIORITY

The present application claims priority to U.S. Provisional Application No. 61/145,505, filed on Jan. 16, 2009 and entitled MAXIMIZING BANDWIDTH UTILIZATION IN NETWORKS WITH HIGH LATENCIES AND PACKET DROPS USING TRANSMISSION CONTROL PROTOCOL which is incorporated by reference herein in its entirety for all purposes.

FIELD OF THE INVENTION

The present invention relates generally to computing systems and networks, and more specifically to systems and methods for avoidance of network latencies and losses caused by data throughput degradation.

BACKGROUND OF THE INVENTION

TCP is one of the most widely used network protocols. Its most important feature is reliable ordered delivery. It is used by many network applications and services which require reliable data connections.

A wide set of application layer protocols which, as a whole, form the basis of today's WEB and networking use TCP as a transport layer protocol. Among them are: HTTP, FTP, mail protocols, data base remote access protocols. VPNs built on SSL use TCP as well. TCP is so popular and wide spread that most existing computer networks feature it. It has become so common that almost all (if not all) widely used operating systems have a built-in TCP implementations.

However, TCPs main weakness is its incapability of utilizing the entire available bandwidth of a network channel it operates on. This weakness originates from TCPs main advantage which was already mentioned: reliable ordered delivery. To be more precise—a number of mechanisms which provide TCPs reliability, like the sliding window and congestion avoidance mechanisms also contribute to TCP's inefficiency.

TCP's reliable delivery is based on a data acknowledgement mechanism, i.e. each data portion sent is acknowledged by receiver side on receipt. For this purpose, each data portion sent in TCP packet is supplied with Sequence Number which is present in the TCP segment header. Once the data is received, receiver side sends an acknowledgement to data transmitting side by setting an appropriate Acknowledgement Number of backwards TCP segment header. Thus the Acknowledgement Number field of incoming segment indicates the greatest number of data byte which has left the network and was accepted by receiver side. It is obvious that waiting for acknowledgement of every single portion of data before sending another would take too long, that is why a sliding window mechanism is used. TCP specification uses term Send Window Size to indicate the amount of data (in bytes) which can be sent in advance without waiting for acknowledgement. In other words the difference between the Sequence Number of most recently sent data byte and the most recently received Acknowledgement Number must not exceed the Send Window Size value. Once the new acknowledgement is received, the window is shifted and transmission of new data portion is allowed.

This sliding window mechanism is rather simple and provides a possibility of reliable delivery and good throughputs rates at the same time. But an obvious throughputs upper limitation comes from it: the transmission rate is limited to Send Window Size divided by an RTT [bytes/second] value, where RTT is connections Round Trip Time (the time passed from transmission till the acknowledgement of most recently acknowledged data byte). It may easily be seen that the higher RTT (network path latency) is the lower transmission rate may be reached for a particular Send Window Size.

The above limitation is in fact so serious that TCP is hardly ever used as a transport for time critical or performance critical transmissions. Such services as VoIP, which require high transfer rates but are not critical to reliable delivery rather use unreliable but fast UDP transport instead, so do other similar protocols/services.

TCP's performance problems get worse as network bandwidths grow higher. Currently used TCP Send Window Size calculation algorithms often do not allow the utilization of more than 10%-30% of the available bandwidth of broadband connections with 100-200 milliseconds latencies.

Many attempts have been made to overcome the described limitation. They all are based on increasing the send Window Size and keeping it high since there is no way to decrease the present network latencies by manipulating the TCP protocol.

The well known TCP modifications Tahoe, Reno, New Reno and Vegas all propose different ways of Send Window Size calculations and transmission/retransmission control and describe their own TCP behavior algorithms for TCPs main phases: Slow Start, Congestion Avoidance, Fast Retransmit and Fast Recovery.

TCP Tahoe consequently runs Slow Start and Congestion Avoidance phases. During Slow Start the Congestion Window Size is initially set to Maximum Segment Size and then increased by acknowledged data size on each arriving acknowledgement thus being increased exponentially. The Congestion Window Threshold value is introduced. When Congestion Window Size reaches Congestion Window Threshold, TCP enters the Congestion avoidance phase during which Congestion Window Size is increased linearly (by acknowledged data size divided by Congestion Window Size on each arriving acknowledgement). The Threshold is initially set to Maximum Window Size. On packet loss, the Threshold is set to half of Congestion Window Size and Slow Start Algorithm is involved. The main TCP Tahoe problems significantly degrading its throughputs are late loss detection (Tahoe detects losses by timeouts only) and periodical Slow Start fallback.

TCP Reno keeps the TCP Tahoe's basic concept however a technique called 'Fast retransmit' which allows early packet loss detection is introduced. According to the fast retransmit technique, packet loss has to be indicated immediately by remote receiver by the means of multiple duplicate acknowledgements. After immediate packet retransmission TCP Reno does not return to Slow Start but performs a Fast Recovery. Window Threshold and Congestion Window Size are set to half of initial Congestion Window Size. Then Congestion Window Size is increased by MSS on every arriving duplicate acknowledgement and new data transmission is allowed if Congestion Window Size exceeds the currently unacknowledged data size. After performing Fast Recovery which is finished on fresh acknowledgement receipt TCP Reno returns to Congestion Avoidance.

TCP New-Reno inherits TCP Reno mechanisms but implements the modified Fast Recovery phase. The Fast Recovery is not exited until all packets which were sent to the network by the moment of packet loss detection are acknowledged. The partial acknowledgement (not covering the whole amount of data transmitted by the moment of loss detection) is treated as an evidence of successive losses and more packets are retransmitted immediately.

TCP Vegas is a TCP Reno modification. TCP Vegas uses additional congestion avoidance mechanisms based on expected and real bandwidth estimations and adjusts Congestion Window Size in accordance with them. TCP Vegas does also perform an early retransmits before the packet loss is indicated by duplicate acknowledgement initiated by unexpectedly high RTT detection.

The present invention follows none of these techniques but rather uses new technologies to achieve the optimum bandwidth utilization which none of the above modifications are capable of.

SUMMARY OF THE INVENTION

Embodiments of the present invention may include two aspects: TCP protocol modifications and a technique of introducing these modifications to an existing OS. These aspects may be used in combination or separately.

TCP protocol modification implies modifying existing TCP implementations to introduce new TCP protocol behaviors during data transmission/retransmission and new algorithms of Send Window Size calculation in order to improve the performance of TCP.

The introduction techniques imply using the software implementing the TCP modification in existing computer systems without a need of removing or disabling an existing TCP implementation that may already be provided as part of a host OS of the existing computer system, but instead modifying the behavior of the existing TCP implementation and retaking a partial data transmission control from it in a proper way to achieve the desired results.

TCP modification introduced in the present invention allows maximizing the available bandwidth utilization. An advantage of the TCP modification scheme according to the embodiments of the present invention is the absence of the requirement that the same modification be operational at the sender's and the receiver's sides' TCP implementations (according to some embodiments, the modification only needs to be present at the sender's side). This distinguishes embodiments of the present invention from previous attempts at TCP modification which need a compatible modification to be operational at both sides of the connection, such as SACK, Window Scaling and others.

DESCRIPTION OF THE ILLUSTRATED EMBODIMENTS

Figure 1:
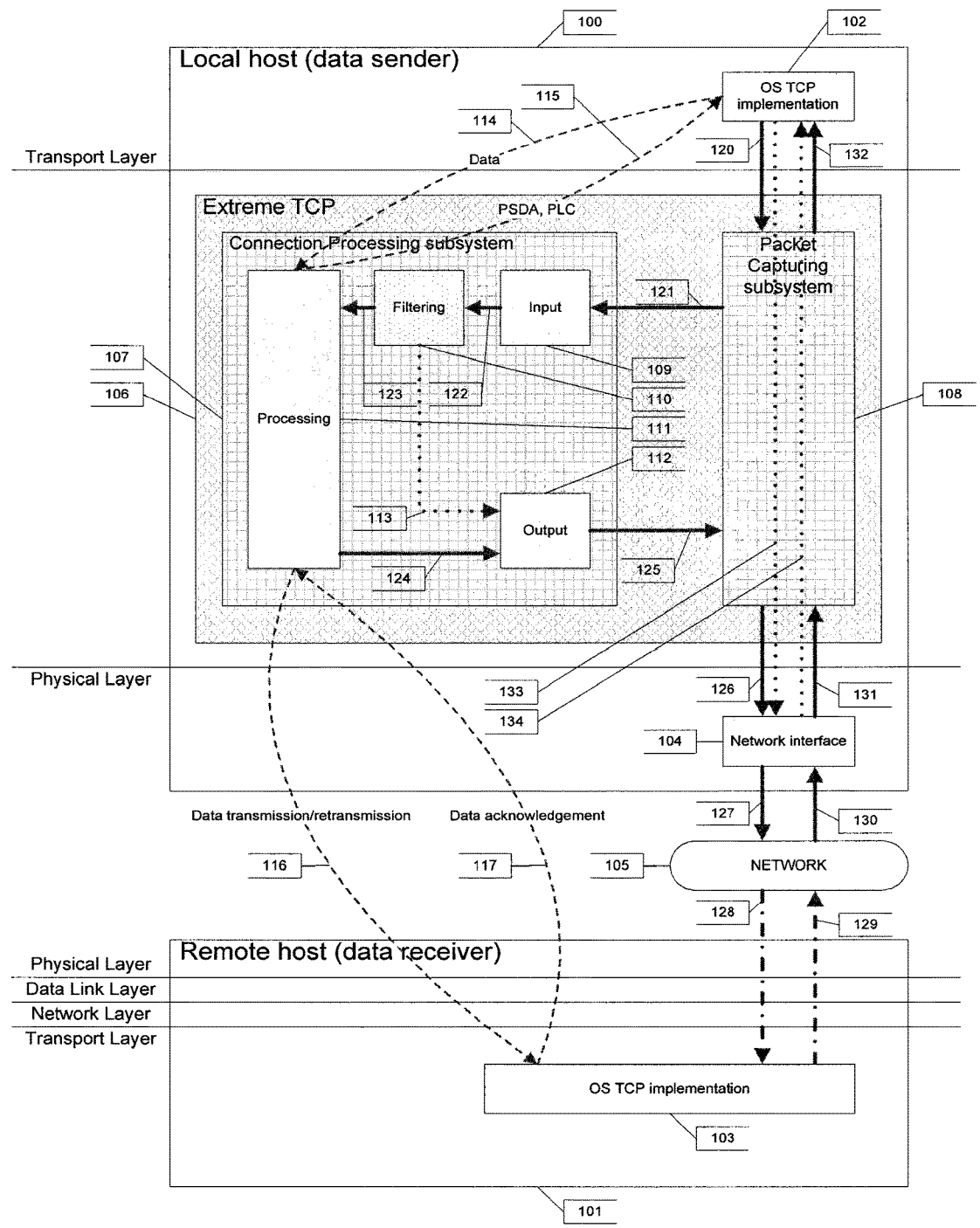
FIG. 1 illustrates the technique of introduction of embodiments of the present invention, to a computer system running an OS with built in TCP protocol support and communication data flows.

Embodiments of the current invention introduce modifications of the TCP protocol which are generally relative to its data transmission/retransmission algorithms and particularly to Send Window Size calculations during different TCP runtime phases.

Different TCP modifications may be distinguished by their congestion avoidance techniques. TCP Tahoe, Reno and New-Reno use so called 'reactive' congestion avoidance which means such modifications may detect the congestion only after it has occurred. 'Reactive' congestion avoidance assumes that Send Window Size is being increased until packet loss is detected. Packet loss is regarded as congestion evidence and required actions are taken depending on particular modification. Such reactions may include Send Window Size and Send Window Threshold Size adjustment, performing retransmit or fast retransmit and entering slow start or fast recovery phases.

One weakness of such 'reactive' congestion avoidance is the fact that congestions are not avoided at all. TCP proceeds increasing the Send Window Size until the channel is congested and the future measures only decrease the congestion and prevent packet losses for some period of time. Acting this way, the TCP implementation goes from one congestion to another which causes transmission rates to vary slightly and sufficiently decreases overall throughput.

TCP Vegas uses a different mechanism called 'proactive' congestion avoidance. Its idea is to avoid the congestions before they really occur. TCP Vegas uses different estimations for adjusting Send Window Size and making a retransmission decision. These estimations are based on expected and real throughputs difference values and base and current RTT difference values. Such measures do really allow avoiding most of congestions, smoothing transmission rates and optimizing bandwidth usage.

All TCP modifications use similar Send Window Size calculation algorithms for each of connections phases. There commonly used two estimators: Receive Window Size and Congestion Window Size. And Send Window Size is set to the least of them.

During Slow Start phase Congestion Window Size is initially set to Maximum Segment Size and then exponentially increased. On every new acknowledgement received, Congestion Window is increased by the number of data bytes acknowledged by remote side. Such exponential increase is performed until Congestion Window Size reaches Send Size Threshold since then the Congestion Avoidance phase is entered.

Congestion Avoidance phase assumes Congestion Window Size is increased linearly. On every new acknowledgement arrived Congestion Window Size is increased by number of bytes acknowledged divided by Congestion Window Size.

Embodiments of the current invention need not clearly distinguish between Slow Start and Congestion Avoidance phases as do other TCP modifications; they can use a new 'Transmit with Congestion Avoidance' phase instead. During the Transmit with Congestion Avoidance phase current embodiments may increase Send Window Size exponentially or linearly or decrease it depending on the current RTT value. Embodiments of the invention may also use different rules during a 'Retransmit' phase when they retransmit lost packets. Packet loss is considered to happen when one of the following occurs: the retransmission timeout for a specific packet has expired, a 3rd duplicate acknowledgement for a specific packet has arrived or a packet is out of selective acknowledgement gap indicated by receiver while later packets are in the selective acknowledgement gap.

Embodiments of the invention can base Send Window Size adjustment decisions on the following. Network path latency is dependent on intermediate routers' queues' fullness. Once queues are empty all packets are forwarded by routers immediately and no additional latencies caused by packets waiting for service in routers queues are present. This fact identifies that network path is not congested and routers cope with transmitting at present rates. In this case a packet and its acknowledgement can pass through the network route in shortest possible time. Once the routers' queues start filling up with packets, network latency begins to grow gaining a small increment at each router a packet traverses. This fact allows some embodiments of the invention to implicitly track the network path routers' queues' fullness and consequently estimate whether the network path is congested or not in order to make a Send Window Size adjustment decision.

Even if the network path was initially partially congested, the difference between RTTs calculated after Send Window Size adjustment (and therefore additional packets injection) and minimum RTT is the evidence of network state changes. And the magnitude of the difference is used to make Send Window Size adjustment decisions. This technique is called 'Latency Based Window Adjustment'. This technique also takes into consideration such parameters as RTT variation and RTT change speed which helps to make a more precise decision of a moment and magnitude of Send Window Adjustment.

Some embodiments of the invention can use the following parameters to perform Send Window Size adjustment process:

1. RTT—round trip time or round trip delay time, the time elapsed between the transmission of a packet and the receipt of its acknowledgement.
2. MIN_RTT—the minimal RTT noticed during a predefined period of connection operation (MIN_RTT lifetime is described below).
3. NEW_RTT—RTT of the most recently acknowledged segment.
4. S_RTT—smoothed RTT estimator, S_RTT=(S_RTT*(RTT_SW−1)+NEW_RTT)/RTT_SW, where RTT_SW is RTT smoothing window size, thus S_RTT is a sort of an average of NEW_RTT values measured for latest RTT_SW acknowledgements. S_RTT is in fact similar to the original TCPs smoothed RTT estimator.
5. RTT_AVAR—RTT absolute variation which is measured on each acknowledgement and smoothed for VAR_SW number of acknowledgements, where VAR_SW is variation smoothing window size. RTT_AVAR=(RTT_AVAR*(VAR_SW−1)+NEW_AVAR)/VAR_SW, where NEW_AVAR is recently measured absolute variation, NEW_AVAR=NEW_RTT−S_RTT.
6. RTT_RVAR—RTT relative variation, RTT_RVAR=RTT_AVAR/S_RTT.
7. RTT_AGRW—RTT absolute growth which is measured on each acknowledgement and smoothed for GRW_SW number of acknowledgements, where GRW_SW is growth smoothing window size. RTT_AGRW=(RTT_AGRW*(GRW_SW−1)+NEW_AGRW)/GRW_SW, where NEW_AGRW is recently measured absolute growth, NEW_AGRW=new S_RTT−previous S_RTT.
8. RTT_RGRW—RTT relative growth, RTT_RGRW=RTT_AGRW/S_RTT.
9. RTO—retransmission timeout, RTO=S_RTT*tot, where tot is timeout threshold.
10. ACK_DS—acknowledged data size, number of bytes acknowledged by the most recently received acknowledgement number.
11. MAX_RWND—maximum receive window size, ever advertised by receiving side.
12. NEW_RWND—recently advertised remote receiver window size.
13. SWND—send window size, number of bytes allowed to be sent without acknowledgement.
14. AWND—actual window size, number of bytes which has already been sent but not yet acknowledged.
15. SWND_GRW—send window size growth, measured and smoothed on every SWND increase. This value is the smoothed SWND growth during latest MIN_RTT period. SWND_GRW is incremented each time SWND is incremented by the same value SWND is and smoothed immediately after this according to the following formula: SWND_GRW=SWND_GRW−SWND_GRW*(dt/MIN_RTT), where dt—is time interval passed from the latest smoothing. SWND_GRW should not go below 0.
16. EIRT—exponential increase RTT threshold, the time value (in parts of MIN_RTT) which NEW_RTT has not to exceed over MIN_RTT for SWND could be increased exponentially.
17. EIGT—exponential increase growth threshold, the value which RTT_RGRW/RTT_RVAR (or RTT_AGRW/RTT_AVAR) should not exceed for SWND could be increased exponentially.
18. EIID—exponential increase increment divider, the value by which SWND increment is divided during exponential increase.
19. LIRT—linear increase RTT threshold, the time value (in parts of MIN_RTT) which NEW_RTT has not to exceed over MIN_RTT for SWND could be increased exponentially.
20. LIGT—linear increase growth threshold, if RTT_RGRW/RTT_RVAR does not exceed this value, SWND can be increased linearly.
21. LIID—linear increase increment divider, the value by which SWND increment is divided during linear increase.
22. CART—congestion avoidance RTT threshold (this time value is measured in parts of MIN_RTT); if NEW_RTT exceeds MIN_RTT by CART, SWND is decreased to avoid congestion.
23. CAGT—congestion avoidance growth threshold, if RTT_RGRW/RTT_RVAR exceeds this value, SWND is decreased to avoid congestion.
24. CAWT—congestion avoidance window growth threshold. If SWND_GRW exceeds CAWT, SWND is decreased linearly, SWND is decreased proportionally otherwise.

25. OAWT—overflow avoidance window threshold. If RWND goes below this value the transmission is paused until RWND is advertised enough high again.
26. CCRT—characteristics change RTT threshold. When SRTT exceeds this threshold, the network state is expected to change significantly and essential connection parameters like MIN_RTT are reset and refreshed.
27. CADD—congestion avoidance decrement divider, the value by which SWND decrement is divided during congestion avoidance decrease.
28. PDDD—proportional decrease decrement divider, the value by which SWND decrement is divided during proportional decrease on congestion avoidance or packet loss.

According to some embodiments, a Transmit with Congestion Avoidance phase starts at the very beginning of connection operation. Initially Send Window Size is set to m*MSS where 'm' is minimum window size in segments and 'MSS' is maximum segment size for this particular connection. Then Send Window Size is adjusted for every incoming non-duplicate acknowledgement. SWND adjustment decision is made in accordance with RTT values and RTT growth magnitude which indicates the channel state as mentioned above. In some embodiments, there are 4 channel states: free, occupied, nearly congested, congested. 'Free', 'occupied' and 'nearly congested' channel states are indicated by low, medium and high RTT values (relative to MIN_RTT), respectively. 'Congested' state is indicated by packet losses alongside with high RTT values. SWND is exponentially increased while the network is determined to be in 'free' state and is increased linearly when RTTs grow higher and the network becomes 'occupied'. High RTT is very likely to be the evidence of approaching congestion, RTT does usually grow when routers queues become near filled and there actually is no difference whether this particular connection is trying to transmit at too high rates or some other connection has acquired a portion of bandwidth of the same bottleneck. Thus when the network state is detected to be 'nearly congested' SWND is decreased to avoid the possible congestion. The case when packet loss has already occurred and the network state became 'congested' is not treated in 'Transmit with Congestion Avoidance' phase and is described later.

Additional conditions relative to RTT growth speed are applied to determine the moment of SWND adjustment. RTT usually does not increase instantly but grows continuously while the network is being congested. When the network is in a stable state, RTT usually oscillates around S_RTT, RTT growth therefore oscillates around 0. But the fact that RTT growth has become noticeable means that RTT will very likely continue increasing. This allows embodiments of the invention to make a SWND adjustment decision in advance. Smaller RTT growth may be caused by some network instabilities as well as by network approaching the 'nearly congested' state. In this case, embodiments of the invention may stop increasing SWND for a while until the situation stabilizes. But when RTT growth becomes sufficiently fast, it is most likely that this particular or some other connection has began to congest the network and there is no reason to wait until (NEW_RTT−MIN_RTT) difference exceeds the threshold to begin decreasing SWND. Instead, embodiments of the invention may begin decreasing SWND based on the rate of RTT growth. This technique allows embodiments of the invention to detect the approaching congestion some several packets earlier than RTT difference technique does. This may be crucial, because these packets are often the ones which could have been lost during the possible congestion.

The SWND increase is also stopped when RTT growth is too low below zero. Such negative growth values indicate network instabilities caused by some connection finishing its transmission or after-congestion channel purge, SWND should not be increased in these cases on small RTT until the situation stabilizes. If SWND increased during instabilities, it might exceed its actual maximum possible value for the particular network path. However SWND is not decreased on negative RTT growth values since they do not indicate approaching congestion.

Since different networks and network paths are characterized by different RTT variation magnitudes the RTT growth is adjusted by division by RTT variation which allows to avoid making most of the faulty decisions of SWND adjustment when high RTT variation (or oscillation) is confused for sustained RTT growth.

Send Window Size is increased exponentially if NEW_RTT<=MIN_RTT*(1+EIRT) and |RTT_RGRW/RTT_RVAR|<=EIGT. This condition comes from a conclusion that if RTT is sufficiently low, the network is in a 'free' state and SWND is allowed to grow fast in order to achieve the maximum bandwidth utilization rapidly. Exponential increment is generally not a constant value and depends on NEW_RTT, the closer it is to the MIN_RTT*(1+EIRT) the lesser increment is. Exponential increment is calculated in accordance with the following formula: ACK_DS*{[1−(NEW_RTT−MIN_RTT)/(MIN_RTT*EIRT)]*(1−1/EIID)+1/EIID}. In other words, exponential increment lies between ACK_DS (when NEW_RTT=MIN_RTT) and ACK_DS/EIID (when NEW_RTT=MIN_RTT*(1+EIRT)) values. This allows to gradually decrease the exponential SWND growth while RTTs difference approaches the threshold.

Send Window Size is increased linearly when MIN_RTT*(1+EIRT)<NEW_RTT<=MIN_RTT*(1+LIRT) and EIGT<|RTT_RGRW/RTT_RVAR|<=LIGT. This is done, because it is believed that under these conditions, RTT is still low enough but the network is already somewhat occupied and therefore SWND has to be increased in a more precise manner. The linear increment is also not a constant value and depends on NEW_RTT. The formula for the linear increment is: (ACK_DS/SWND)*{[(1+LIRT)/(LIRT−EIRT)−(NEW_RTT−MIN_RTT)/(MIN_RTT*(LIRT−EIRT))]*(1/LIID)}. In other words, the linear increment lies between ACK_DS/LIID (when NEW_RTT=MIN_RTT*(1+EIRT)+1/∞) and 0 (when NEW_RTT=MIN_RTT*(1+LIRT)).

Send Window Size is decreased when NEW_RTT>MIN_RTT*(1+CART) or RTT_RGRW/RTT_RVAR|>CAGT which means the network is nearly congested and transmission rates should be altered. The SWND is decreased by SWND_GRW/CADD i.e. SWND is decreased approximately by the value it was RTT milliseconds ago because this is supposed to be the time when the successive SWND (and therefore AWND) increase has worsened the network state. Since the system cannot notice whether its measures has brought any result until a time equal to the current RTT passes, SWND is not allowed to be decremented more frequently than once per MIN_RTT.

If NEW_RTT>MIN_RTT*(1+CART) or |RTT_RGRW/RTT_RVAR|>CAGT but SWND_GRW<CAWT, then the network is being congested by other connections since the current connection is transmitting at constant stabilized rates. Therefore SWND should be adjusted in accordance with the newly appeared conditions. The estimation of the available bandwidth is done according to the well known formula SWND/RTT and since the RTT has changed SWND can be changed at the same rate too. Thus, SWND=SWND*

(MIN_RTT/NEW_RTT). And for the reasons discussed above, SWND should not be decremented more frequently than once per MIN_RTT.

The two above SWND decrement concepts allow avoiding congestions caused by temporary network instabilities, particular connection excessive transfer rates or small occasional transmissions partially occupying the available bandwidth for a while. But large transfers alter the available bandwidth and other network characteristics for quite a long period of time which actually means that the present connection no longer operates in the network it previously used to and connections runtime variables and estimations should be altered as well. All runtime parameters calculations are based on the MIN_RTT value which is a minimal ever noticed RTT and is one of basic network path characteristics. But if the network state has sufficiently changed this characteristic can be considered no longer valid. If S_RTT reaches MIN_RTT*(1+CCRT) value identifies the sufficient network state change which may trigger a MIN_RTT reset. In such case, MIN_RTT can be reset to S_RTT*f, where 'f' is minimum RTT adjustment factor. Thus MIN_RTT lifetime can be determined as a period between noticeable network state changes identified by sufficient S_RTT increase.

The main transmit condition for placing the system in the 'Transmit With Congestion Avoidance' phase is AWND<SWND; however, one more restriction may be applied to avoid remote receiver buffer overflow. The original TCP protocol sets SWND to the least of CWND and RWND. Embodiments of the present invention do not use RWND estimator directly since it usually applies rather strict limitations at SWND even with Window Scaling option enabled. RWND indicates the number of bytes remote receiver is ready to accept at the moment, original TCP implementations would not send more data if this limitation is exceeded. However, embodiments of the present invention may ignore this restriction in order to let own SWND grow excessively and allow faster transmission rates. Still RWND may remain a useful parameter for embodiments of the present invention, as some of said embodiments do not transmit additional data when NEW_RWND<MAX_RWND*OAWT even if AWND<SWND condition is met. This may ensure that remote receiver buffers do not overflow. If advertised RWND begins falling too low, this identifies that there are a lot of wrongly ordered packets in the remote receiver buffer and reordering is being performed at the moment or the remote receiver is not capable of accepting packets at current transfer rates. Both of these conditions lead to buffer overflow and mass packet drop if transfer rates are not decreased immediately. For that reasons, embodiments of the invention provide for pausing of transmission until sufficiently large RWND is advertised again.

According to some embodiments of the invention, a second runtime phase may be used—this is the 'Retransmit' phase. During the Retransmit phase, packets previously detected as being lost are retransmitted and no normal transmissions are allowed regardless of whether all conditions are met. As mentioned above, packet loss is identified by one of the following: RTO for particular segment has expired, a 3rd duplicate acknowledgement for a particular segment has arrived or a packet is out of selective acknowledgement gap indicated by receiver while latter packets are in the selective acknowledgement gap.

RTO value is calculated according to the following formula: RTO=S_RTT*a+RTT_AVAR*b on each RTT measurement. If an RTO period is discovered to be elapsed from the particular packets send time during the regular check, the packet is considered to be lost, the system enters the 'Retransmit' mode and the packet is retransmitted. RTO expiration usually indicates mass packet losses due to congestion or some other serious network (or remote receiver) problems since the accidental losses or losses caused by small congestions are most likely to be discovered much earlier by the means of 3rd duplicate acknowledgement or SACK. Once the system has entered 'Retransmit' mode on RTO expiration the SWND is adjusted to SWND=SWND* (MIN_RTT/RTO) and SWND decrease is no longer allowed for next MIN_RTT period and until the 'Retransmit' phase is exited in order to avoid excessive SWND decrease rates.

Packet loss may also be identified by 3rd duplicate acknowledgement or SACK option with the particular packets reported to be not received while the latter ones are. Such event does also push Extreme TCP into 'Retransmit' phase and causes retransmission of lost packets. However such packet loss indication usually identifies that the network is lightly congested at the moment or losses are accidental, thus lesser SWND decrements may be used. Accordingly, SWND can be adjusted to SWND=SWND*(MIN_RTT/ L_RTT), where L_RTT is 'Packet Loss RTT', round trip time measured from the moment lost packet was sent to the moment its loss was indicated. Then SWND is not allowed to be decreased for next MIN_RTT period and until the 'Retransmit' phase is exited.

Right after the lost packet acknowledgement, the system leaves the 'Retransmit' phase and re-enters the 'Transmit With Congestion Avoidance' phase. However packet loss does often lead to later mass acknowledgement on 'Retransmit' exit dependent on how many packets were received by the remote side after the lost one was supposed to. It is a common situation that even after 'on loss' SWND adjustment AWND appears to be much lower than SWND on 'Retransmit' phase exit due to mass acknowledgement. This situation leads to almost instant transmission of quite large amount of data at excessive rates which leads to even more dramatic network congestions. Additional SWND adjustments may be performed on 'Retransmit' phase exit in order to avoid this. If SWND>AWND+MSS*m on 'Retransmit' phase exit, SWND is set to AWND+MSS*m, where MSS is maximum segment size for the connection and 'm' is minimum window size (in MSS).

Embodiments of the present invention may relate to TCP transmission and retransmission mechanisms only. They need not interfere in any of TCP connection establishment/ close/reset techniques. Furthermore, embodiments of the present invention need not be aware of the upper protocol being used over TCP or the data being transferred. Embodiments may treat the data transferred over TCP as a raw octet stream and make no attempts to interfere into upper levels content/operation, modify, copy or pass it to the third party. Thus the TCP transmission/retransmission mechanisms modifications according to the present embodiments need not disrupt the reliable ordered delivery feature of TCP or break TCP compatibility.

Description of Deploying a Technology at a Machine Running an OS Having Built in TCP Implementation Most of commonly used operating systems already have a TCP implementation. Replacement of the built in OS TCP implementation may be rather complex. Therefore, some embodiments of the present invention feature a technique of introducing the modifications of the usual TCP implementation discussed above to an operating system with a built in TCP implementation, without completely replacing the existing TCP implementation. This technique is developed to be flexible and compatible with most widely used OSs. One characteristic of some embodiments is that instead of replacing the existing built in TCP implementation itself, the embodiments may modify its behavior and partially retake transmission/retransmission control from the original implementation in order to provide TCP behavior according to the TCP modifications discussed above.

All present OSs capable of networking implement some variation of ISO's OSI concept according to which network protocols are implemented as a stack of subsystems each serving the corresponding OSI layer (or set of neighbor layers). Embodiments of the present invention may require the ability to intercept/generate packets at layers between network and physical layer to operate properly. Existing OSs usually do provide such capability. Thus, embodiments of the invention can be implemented by software placed somewhere between networking and physical layer implementations and can become an additional intermediate subsystem which looks like the remote receiver for a local sender and looks like sender for remote receiver.

Software implementing embodiments of the invention may consist of the Packet Capturing and Connection Processing subsystems.

The Packet Capturing subsystem provides packet interception and generation capability. This subsystem is the outer communication interface of the software and may allow the exchange of packets with the rest of the local TCP implementation and with a remote receiver.

The Connection Processing subsystem is the subsystem which implements the above described TCP flow control modifications.

The Packet Capturing subsystem is outer subsystem and may be represented by third-party packet capturing software as well as software specifically designed for embodiments of the invention. Embodiments of the invention may be capable of being attenuated for use with any packet capturing software as a Packet Capturing subsystem if such software provides the minimal API allowing at least capturing (intercepting) and transmitting packets at the Data Link or Network Layers.

The Connection Processing subsystem implements the TCP modifications themselves. The Connection Processing subsystem in turn includes a number of subsystems: the Input subsystem, the Filtering subsystem, the Processing subsystem, the Output subsystem.

The Input and Output subsystems form a Connection Processing subsystems data interface. The Input subsystem is in charge of receiving packets from Packet Capturing subsystem and passing them to Processing subsystem through the Filtering subsystem. The Output subsystem is in charge of receiving packets from the Processing subsystem and forwarding them to the Packet Capturing subsystem.

The Filtering subsystem allows to forward packets from Input to Output transparently avoiding the involvement of the Processing subsystem. The packets can be filtered out according to predefined and user defined criteria which allow applying TCP modifications to desired connections only, leaving the remaining connections' behavior unchanged. If available Packet Capturing subsystems provide some filtering capabilities such Packet Capturing subsystems may be used to implement at least a part of the Filtering subsystem. Early packet filtering at the Packet Capturing subsystem may avoid unnecessary time consuming cross-subsystem data transfers and thus increase the overall performance.

The Processing subsystem performs the TCP modifications discussed above. It tracks the state of currently processed connections and performs data transmission/retransmission. Each connection can be associated with a TCP connection entity which can be represented by: identity, data and variables. Identity of the connection is a set of network addresses which allows to unambiguously distinguish the particular connection from the others and associate captured packets with the particular connection entity for further processing. Connection data storage is represented by transmission and retransmission buffers containing packets which are ready to be sent and packets which were sent and are pending for acknowledgement respectively. A connection entity has a wide set of runtime variables reflecting the current state of network and connection itself, such as SWND, AWND, RTTs, variations etc.

The two main techniques some embodiments of the invention use to modify the original built in TCP behavior are: Preemptive Spoof Data Acknowledgement and Packet Loss Concealment.

The original built in TCP implementation is incapable of transmitting at rates higher than SWND/RTT and original SWND is usually not high enough to achieve the desired transfer rates. Embodiments of the present invention may have no knowledge of current original SWND value neither can they change it. Therefore a Preemptive Spoof Data Acknowledgement (PSDA) technique can be used. PSDA includes issuing early acknowledgements (before the real acknowledgement arrives) and forwarding them to the original TCP implementation which forces the original TCP implementation to shift the send window edge and transmit new data. Thus embodiments of the invention can get enough packets to fill the SWND and perform the transmission at desired rates. PSDA may also cause the original TCP to delete the early acknowledged packets from its retransmission buffer but embodiments of the invention may address this by implementing their own retransmission mechanisms. PSDA is performed in two ways: issuing an empty packet with preemptive spoof acknowledgement number or modifying a real incoming packets' acknowledgement number to a preemptive spoof one. A preemptive spoof acknowledgement number is calculated taking into consideration the following: the present software connection entity transmit buffer should always contain enough data to fill the SWND−AWND difference after next real data acknowledgement. Such difference is estimated as an average size of data acknowledged per one real acknowledgement. Preemptive spoof acknowledgement number may also need to meet the following limitation: it should not cover the data which was not yet sent by the original TCP implementation and buffered by the present software, i.e. the preemptive spoof acknowledgement number should never exceed the [recently buffered packet sequence number]+[recently buffered packet data size] value because passing such acknowledgement numbers to the original TCP may result in its undefined behavior and break the connection operation.

Packet Loss Concealment (PLC) is used to prevent the original TCP implementation from noticing actually lost packets and retransmitting them. Though original TCP packets retransmission is not critical for operation of embodiments of the invention (duplicate packets are discarded on processing) retransmission involves additional time costly data transfers and degrades the overall performance. Moreover if the loss of already preemptively spoof acknowledged data (this data has already been removed from original TCP retransmission buffers on spoof acknowledgement) is not concealed from original TCP it may behave unpredictably. PLC is implemented by the means of PSDA and is partially overridden by it. There may be distinguished two sorts of PLC: concealment of RTO expiration indicated loss and concealment of 3rd duplicate acknowledgement indicated loss.

On 3rd duplicate acknowledgement receipt, embodiments of the present invention enter the 'Retransmit' phase and no new packets are transmitted which means the connection entity's transmission buffer is not emptied and the preemptive spoof acknowledgement number is not increased. In this case, the preemptive spoof acknowledgement number is incremented by one for each incoming duplicate acknowledgement to avoid spoofing duplicate acknowledgements for the original TCP. If preemptive spoof acknowledgement number reaches [recently buffered packet sequence number]+[recently buffered packet data size] value it is not incremented any more thus the most recently buffered data byte (which evidently is also the most recently transmitted by original TCP) is spoof acknowledged to original TCP on every arriving duplicate acknowledgement.

RTO expiration concealment is partially overridden by PSDA since most packets are acknowledged in advance before their RTO expiration. However if RTO has expired from the buffering moment for packet which is not covered by preemptive spoof acknowledgement, a special empty spoof packet acknowledging this packets data is issued and forwarded to original TCP. Preemptive spoof acknowledgement number is then adjusted to [sequence number]+[data size] of recently spoof acknowledged packet. However, the RTO calculations of embodiments of the invention need not correlate with original TCP RTO calculations. Thus, the original TCP implementation may detect its inner RTO expiration for a particular packet before the present software issues a spoof acknowledgement for it. This would not be a significant problem since RTO indicated losses are not operation critical, in this case packets indicated to be lost are still present in original TCP retransmission buffer and retransmitted which only causes insufficient degradations for overall performance but not a connection operation crash.

The overall Processing subsystem operation may be described by following algorithms set: Packet association, Connection entity creation, Outgoing packet processing, Incoming packet processing, Transmission, Retransmission with timeout check and PLC.

The operation of processing subsystem begins with waiting for new packet receipt. If some stop conditions are met during this wait, the Processing subsystems abandons this wait and terminates its operation. Otherwise, once the packet is received it is passed for processing.

The Processing subsystem assumes that the packets it receives are already filtered by the Filtering or Packet Capturing subsystem. Still it needs a packet association mechanism which determines which particular connection a received packet relates to. Embodiments of the invention may operate the terms: local IP/port and remote IP/port which represent the network/transport addresses of local and remote hosts respectively. A connection entity's identity is represented by these two pairs of addresses. The received packet is determined to belong to one of the currently tracked connections if packet address set matches ones identity. Once a packet's connection is determined, the packet is processed within the particular connection entity context. If a packet's connection has remained undetermined, it is forwarded to the Output subsystem transparently after checking predefined new connection creation conditions.

Embodiments of the invention may require some essential information which is negotiated during connection establishment for a particular connection that may be further processed by the present invention. Thus a new connection entity may be created for further processing only when a new connection is established while the software of the present invention is monitoring communications. Some embodiments do not create new connection entity for further processing if a connection is already at the middle of its operation (in this case the connection may be filtered out by the Filtering subsystem and processed by the original TCP implementation). A main condition for new entity creation may be the receipt of Network to TCP (remote to local host) packet having SYN flag set. Such important runtime parameters as maximum window size, window scale and maximum segment size are obtained from this connection establishing packet. If the above discussed connection saving conditions are not met, no new connection entity is created and packet is forwarded to Output subsystem without any processing.

After a packet is associated with one of currently existing connection entities as discussed above, it is processed within its context according to the packet direction.

An outgoing (local to remote host) packet is added to connections transmission buffer if the following equation is held true: [new packet sequence number]=[recent packet sequence number]+[recent packet data size]. This condition guarantees that only well ordered packets are buffered by the Processing subsystem for transmission. Meanwhile duplicate or out of order packets are discarded. After new outgoing packet has been buffered the Transmission algorithm is involved.

Incoming (remote to local host) packets are used for getting essential connection state information. They are not stored but forwarded up to TCP transparently after optional minor modifications are applied to them to meet the PSDA and PLC requirements. The first operation taken on incoming packet receipt is connection retransmission buffer check which is performed for purposes of detecting acknowledged packets or retransmission requests. RTT calculations are performed during acknowledgement check as well. If the packet from connection retransmission buffer is acknowledged with the incoming packet ([buffered packet sequence number]+[buffered packet data size]<=[incoming packet acknowledgement number]) NEW_RTT is set equal to the time elapsed from this buffered packet transmission to receipt of its acknowledgement. If a 3rd duplicate acknowledgement of a buffered packet is detected, L_RTT is set equal to the time elapsed from this buffered packet transmission to the receipt of 3rd duplicate acknowledgement. Then acknowledged and requested for retransmission packets are deleted from the retransmission buffer or marked for retransmission respectively. Then runtime variables such as RWND, AWND, S_RTT, RTT variation and growth are refreshed or recalculated. After refreshing these variables, the main parameter—SWND is recalculated. Since SWND, AWND and RWND have possibly changed and transmission of a new packet may now be allowed, the Transmission algorithm is invoked.

The Transmission algorithm includes a send conditions check followed on success by transmission buffer packet extraction and transmission. The Transmission algorithm starts with initial packet selection and send conditions check. The packet with the least sequence number is selected from the transmission buffer and the following send conditions are checked: SWND>AWND+[selected packet data size] and NEW_RWND>MAX_RWND*OAWT. If the above conditions are met, the packet is extracted from the transmission buffer, transmitted and its copy is saved to the retransmission buffer. AWND is then incremented by the transmitted packet's data size. These actions are repeated in a loop until the transmission buffer is emptied or transmission conditions are not met.

Timeout check and retransmission with PLC algorithm may be divided in two sections. During the PLC stage packets from both the transmission and retransmission buffers are checked to determine whether an RTO period has elapsed from the moment each respective packet was initially buffered (i.e., the moment the original TCP implementation transmitted said packet). If such packets are present and not yet acknowledged by the means of PSDA, the special loss concealment spoof acknowledgement packet is issued and forwarded to original TCP in order to prevent it from noticing RTO expiration and retransmitting. The loss concealment spoof acknowledgement number has to cover the most recently buffered packet with RTO expired from the moment of its buffering. Then a preemptive spoof acknowledgement number is set to loss concealment spoof acknowledgement number. Timeout check and retransmission phase assumes the packets from retransmission buffer to be checked for RTO expiration and marked for retransmission. All packets marked for retransmission during incoming packet processing or timeout check are then retransmitted but following restrictions are applied to avoid excessive retransmission rates: a particular packet is allowed to be retransmitted only once per MIN_RTT and the overall retransmission rate should not exceed the estimated available bandwidth.

FIG. 1 illustrates the technique of introduction of embodiments of the present invention, to a computer system running an OS with built in TCP protocol support and communication data flows. A software implementing embodiments of the present invention is introduced to data sender system and performs its operation between Physical and Transport ISO OSI model layers. This software is presently referred to as "Extreme TCP." The data sender system may be an ordinary personal computer, or any computer that sends data through the TCP protocol. The software intercepts network packets and changes the standard flow of TCP operation by the means of intercepted packet modifications and new packet generation. Extreme TCP software 106 is introduced to the data sender system 100 performing the data transmission to remote data receiver system via TCP connection established between local TCP 102 and remote TCP 103. Extreme TCP software 106 breaks the direct connection flow between local TCP 102 and remote TCP 103 and becomes an intermediate virtual host running own TCP modification. Extreme TCP software consists of Connection Processing subsystem 107 and Packet Capturing subsystem 108. Packet Capturing subsystem 108 intercepts the network packets of both incoming and outgoing directions and redirects them to Connection Processing subsystem 107. Normal flow of network packets may be described as the following sequence of entities and data flows: [local TCP 102-data flow 133-local network interface 104-data flow 127-network 105-data flow 128-remote TCP 103] and inverse order for backwards direction. The redirected flow of outgoing packets looks like: [local TCP 102-data flow 120-Packet Capturing subsystem 108-data flow 121-Connection Processing subsystem 107-data flow 125-Packet Capturing subsystem 108-data flow 126-local network interface 104-data flow 127-network 105-data flow 128-remote TCP 103] and incoming packets follow this flow: [remote TCP 103-data flow 129-network 105-data flow 130-local network interface 104-data flow 131-Packet Capturing subsystem 108-data flow 121-Connection Processing subsystem 107-data flow 125-Packet Capturing subsystem 108-data flow 132-local TCP 102].

Connection processing subsystem 107 consists of Input subsystem 109, Filtering subsystem 110, Processing subsystem 111 and Output subsystem 112. Input 109 and Output 112 subsystems are in charge of communication between Connection Processing subsystem 107 and Packet Capturing subsystem 108. Filtering subsystem 110 filters out the irrelevant packets and forwards them to the Output 112 and then to Packet Capturing subsystem 108 immediately and transparently via data flow 113. Filtering subsystem 110 may be fully or partially implemented by the means of Packet Capturing subsystem 108 if appropriate features are provided by it.

Processing subsystem 111 embodies the implementation of the protocol modification of embodiments of the present invention. Its architecture and operation are represented in common by FIG. 2 and details are given by FIG. 3-9. There may be several distinct virtual data communication flows between the Processing subsystem 111, local 102 and remote TCP 103.

Virtual data flow 114 is represented by: [local TCP 102-data flow 120-Packet Capturing subsystem 108-data flow 121-Input subsystem 109-data flow 122-Filtering subsystem 110-data flow 123-Processing subsystem 111]. Processing subsystem 111 receives data from local TCP 102 via virtual data flow 114, buffers the data and transmits/retransmits it to remote TCP 103 via virtual data flow 116 in accordance with Extreme TCP protocol modification concepts. Virtual data flow 116 is represented by: [Processing subsystem 111-data flow 124-Output subsystem 112-data flow 125-Packet Capturing subsystem 108-data flow 126-local network interface 104-data flow 127-network 105-data flow 128-remote TCP 103]. Remote TCP 103 acknowledges the received data to Processing subsystem 111 via the virtual data flow 117: [remote TCP 103-data flow 129-network 105-data flow 130-local network interface 104-data flow 131-Packet Capturing subsystem 108-data flow 121-Input subsystem 109-data flow 122-Filtering subsystem 110-data flow 123-Processing subsystem 111. Processing subsystem modifies the behavior of local TCP 102 by the means of PSDA and PLC communicated via virtual data flow 115: [Processing subsystem 111-data flow 124-Output subsystem 112-data flow 125-Packet Capturing subsystem 108-data flow 132-local TCP 102].

Figure 2:
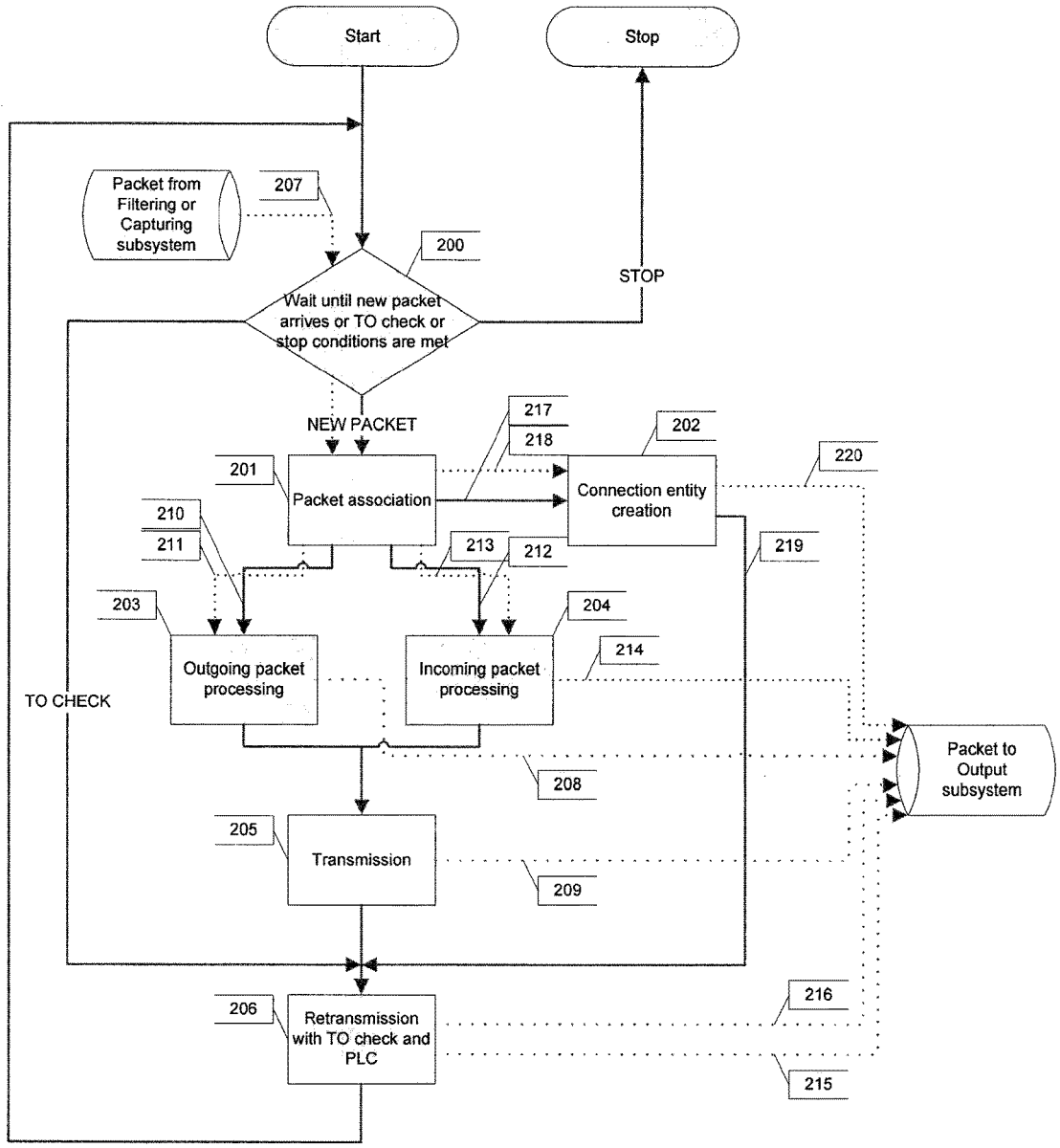
FIG. 2 illustrates the Processing subsystem architecture and operation of the present invention.

FIG. 2 illustrates the Processing subsystem architecture and operation. Solid lines represent the control flow of Processing subsystem main loop. Processing subsystem infinitely waits for one of the following: stop conditions are met, Timeout check time has come or new packet is received from Filtering/Input subsystem via data flow 207. Processing subsystem stops immediately when stop conditions are met. If Timeout check time has come the control is passed to Retransmission with Timeout check and PLC algorithm 206, Processing subsystem is put to wait state on its completion. If new packet is received from Filtering/Input subsystem Packet association 201 is performed. If recently received packet was successfully associated with one of currently processed connection entities the control and data are passed to either of Outgoing 203 or Incoming 204 packet processing according to packet direction via control flow 210 and data flow 211 or control flow 212 and data flow 213 respectively. Outgoing packet processing algorithm 203 buffers the received packet and performs the PSDA issuing a preemptive spoof acknowledging packet and forwarding it to Output subsystem via data flow 208. Incoming packet processing algorithm 204 refreshes the connection state and runtime variables, modifies the received packet in purposes of PSDA and PLC and forwards it to Output subsystem via data flow 214. The control is then passed to Transmission algorithm 205 which transmits previously buffered packets by forwarding them to Output subsystem via data flow 209. The Retransmission with Timeout check and PLC algorithms checks for RTO expiration indicated losses and PLC necessity, issues loss concealment spoof acknowledgement packets and forwards them to Output subsystem via data flow 215 and then retransmits required packets by forwarding them to Output system via data flow 216. Then Processing subsystem is put to wait state. If new packet was not associated with any of currently processed connection entity it is passed for processing to Connection entity creation algorithm 202 which checks whether the creation of new entity representing this packets connection is possible. Control and data are transferred to Connection entity creation algorithm, via control flow 217 and data flow 218. Connection entity creation then forwards the packet to output subsystem via data flow 220 and passes control to Retransmission algorithm 206 via flow 219.

Figure 3:
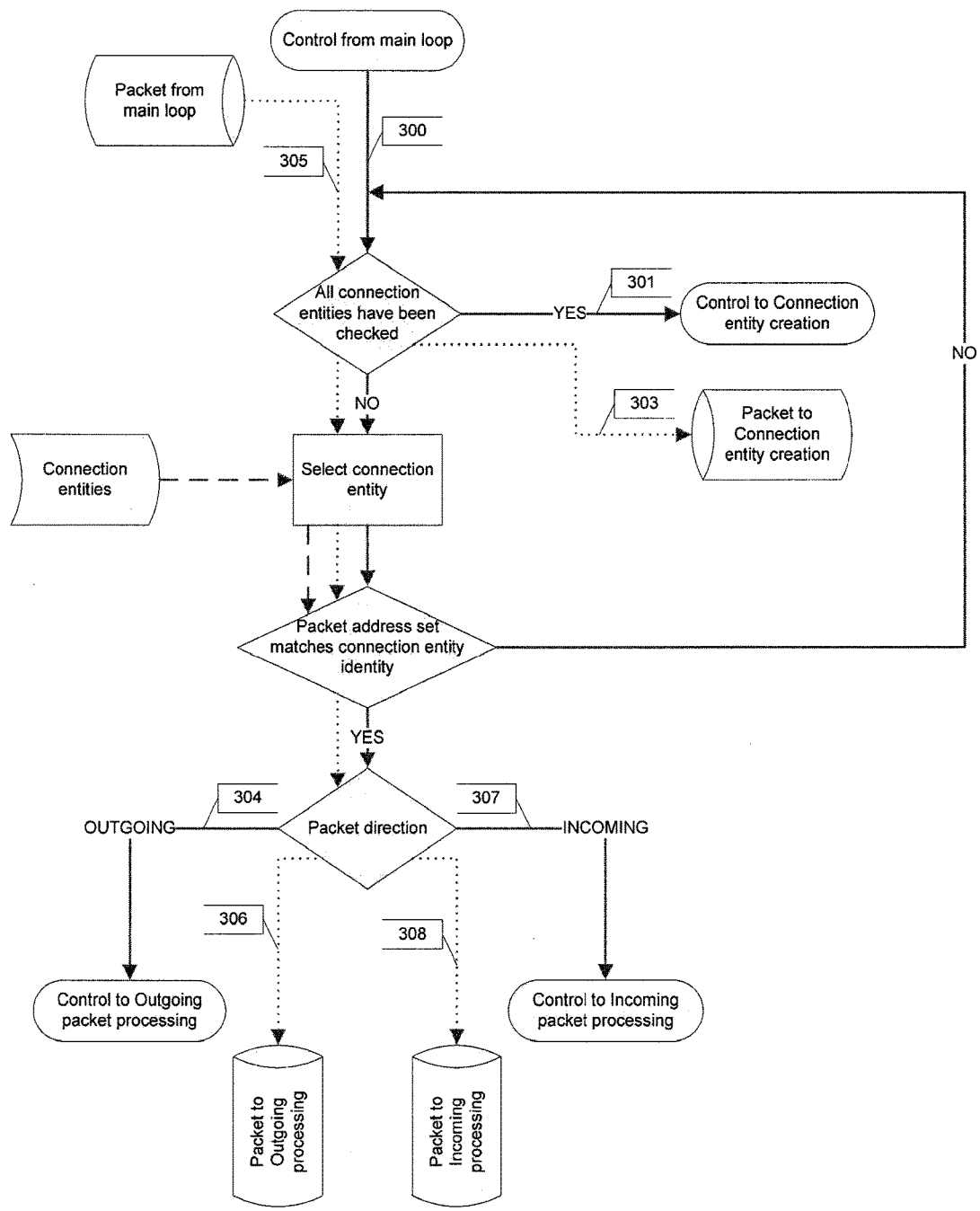
FIG. 3 illustrates the Packet association algorithms of the present invention.

FIG. 3 illustrates the Packet association algorithms. It receives control (via control flow 300) and data (via data flow 305) from Processing subsystem main loop. The packet is then checked to belong to of currently processed connection entities. If no matching connection entity was found for a received packet the control (via control flow 301) and data (packet via data flow 303) are passed to Connection entity creation algorithm. If the matching connection entity was found the control and data are passed to either Outgoing or Incoming packet processing algorithm via control flow 304 and data flow 306 or control flow 307 and data flow 308 respectively.

Figure 4:
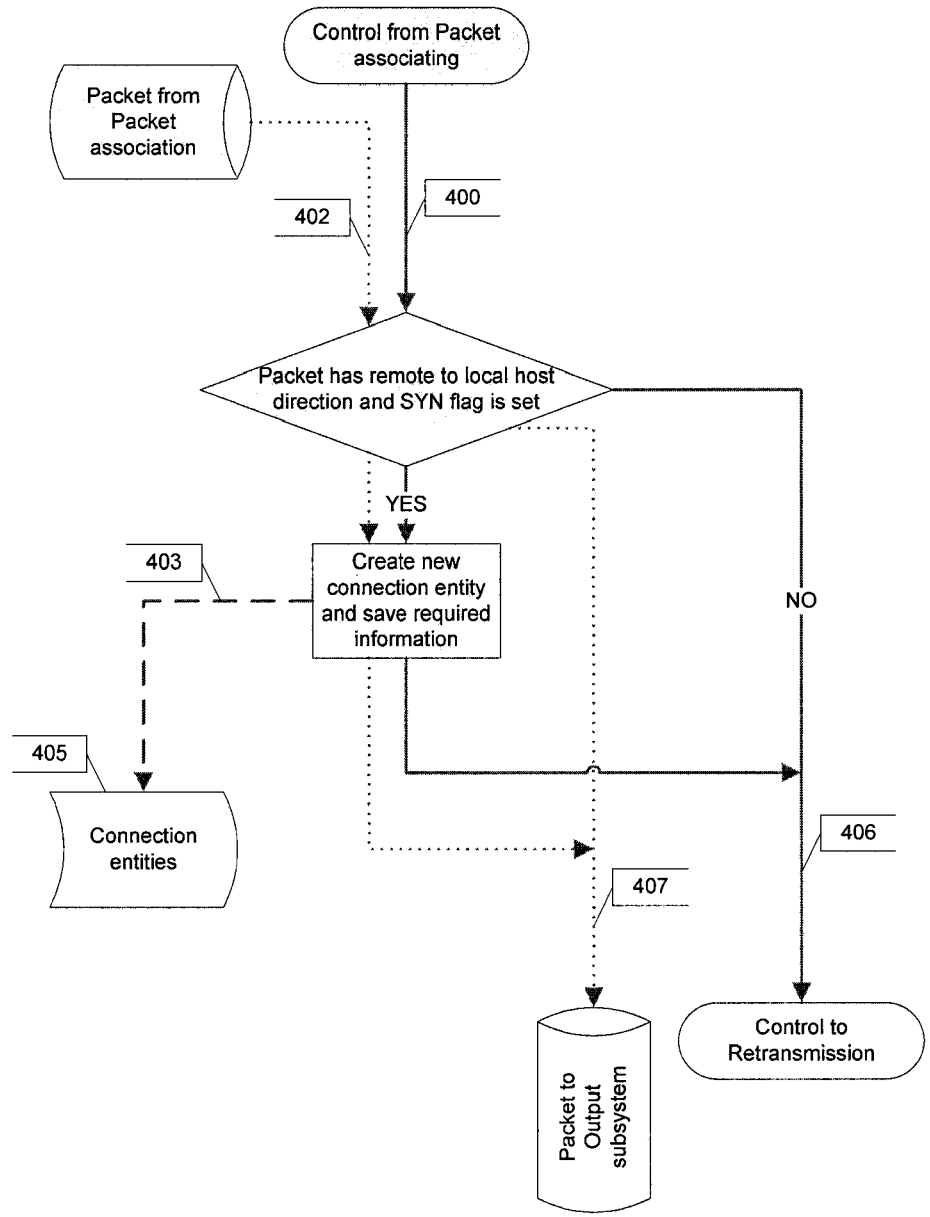
FIG. 4 illustrates the Connection entity creation algorithm of the present invention.

FIG. 4 illustrates the Connection entity creation algorithm. It receives control (via control flow 400) and data (packet via data flow 402) from Packet association algorithm. If new connection entity creation conditions are met, the new entity is created and saved to connection entities buffer 405 via data flow 403. Packet is then forwarded to Output subsystem via data flow 407 and control is returned to Processing subsystem main loop via control flow 406 regardless the new entity creation conditions were met or not.

Figure 5:
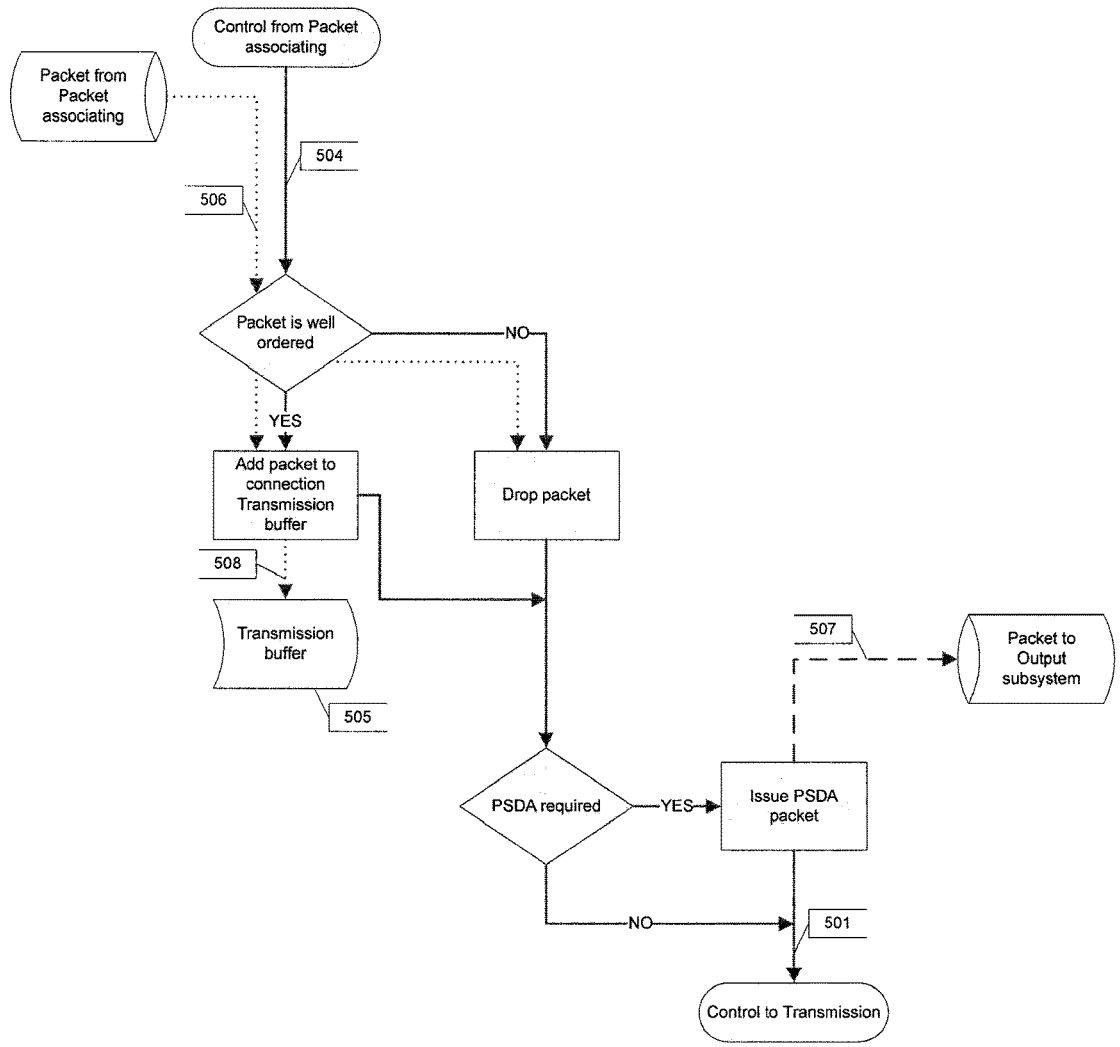
FIG. 5 illustrates the Outgoing packet processing algorithm of the present invention.

FIG. 5 illustrates the Outgoing packet processing algorithm. It receives control (control flow 504) and data (packet via data flow 506) from Packet association algorithm. The received packet is checked to match the conditions of well ordered continuous data transmission. If the packet is duplicate or wrong ordered it is discarded and dropped. If packet is well ordered it is saved to connection entity Transmission buffer 505 (via data flow 508). Then PSDA necessity is checked and preemptive spoof acknowledgement packet is issued and forwarded to Output subsystem via data flow 507. Control is passed to Transmission algorithm on completion (control flow 501).

Figure 6:
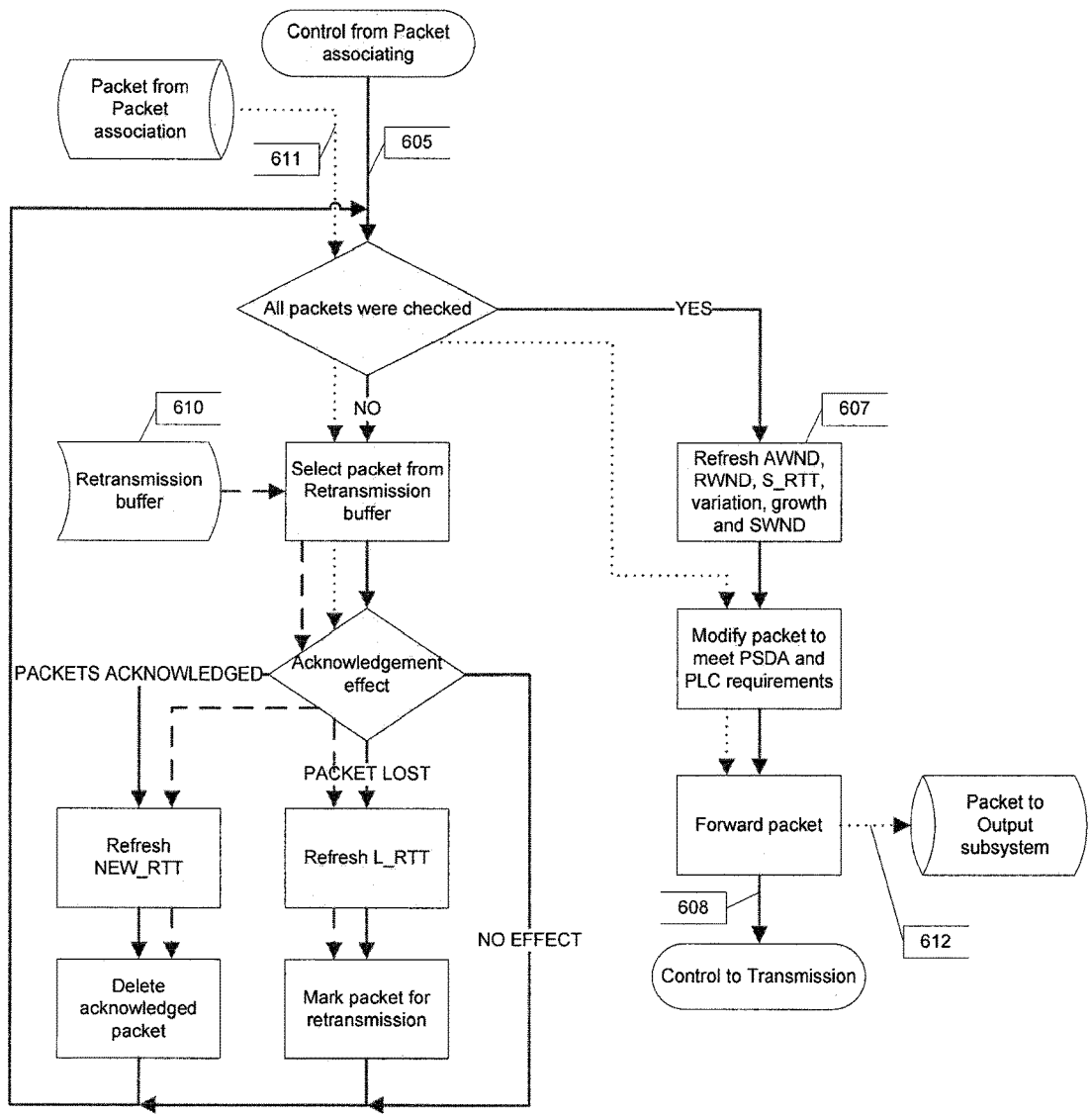
FIG. 6 illustrates the Incoming packet processing algorithm of the present invention.

FIG. 6 illustrates the Incoming packet processing algorithm. It receives control (flow 605) and data (packet via data flow 611) from Packet association algorithm. The packets from connection entity Retransmission buffer 610 are checked to be acknowledged or requested for retransmission by the received packet. If packets are acknowledged NEW_RTT is refreshed and acknowledged packets are deleted from Retransmission buffer 610. If retransmit request is detected, the required packets are marked for further retransmission. When all buffered packets are checked connection state and runtime variables are refreshed. The calculation of SWND which is obviously the essence of Extreme TCP protocol modification is taken here (algorithm 607). Then received packet is modified to match the requirements of PSDA and PLC and forwarded to Output subsystem via data flow 612. Control is passed Transmission algorithm (flow 608).

Figure 7:
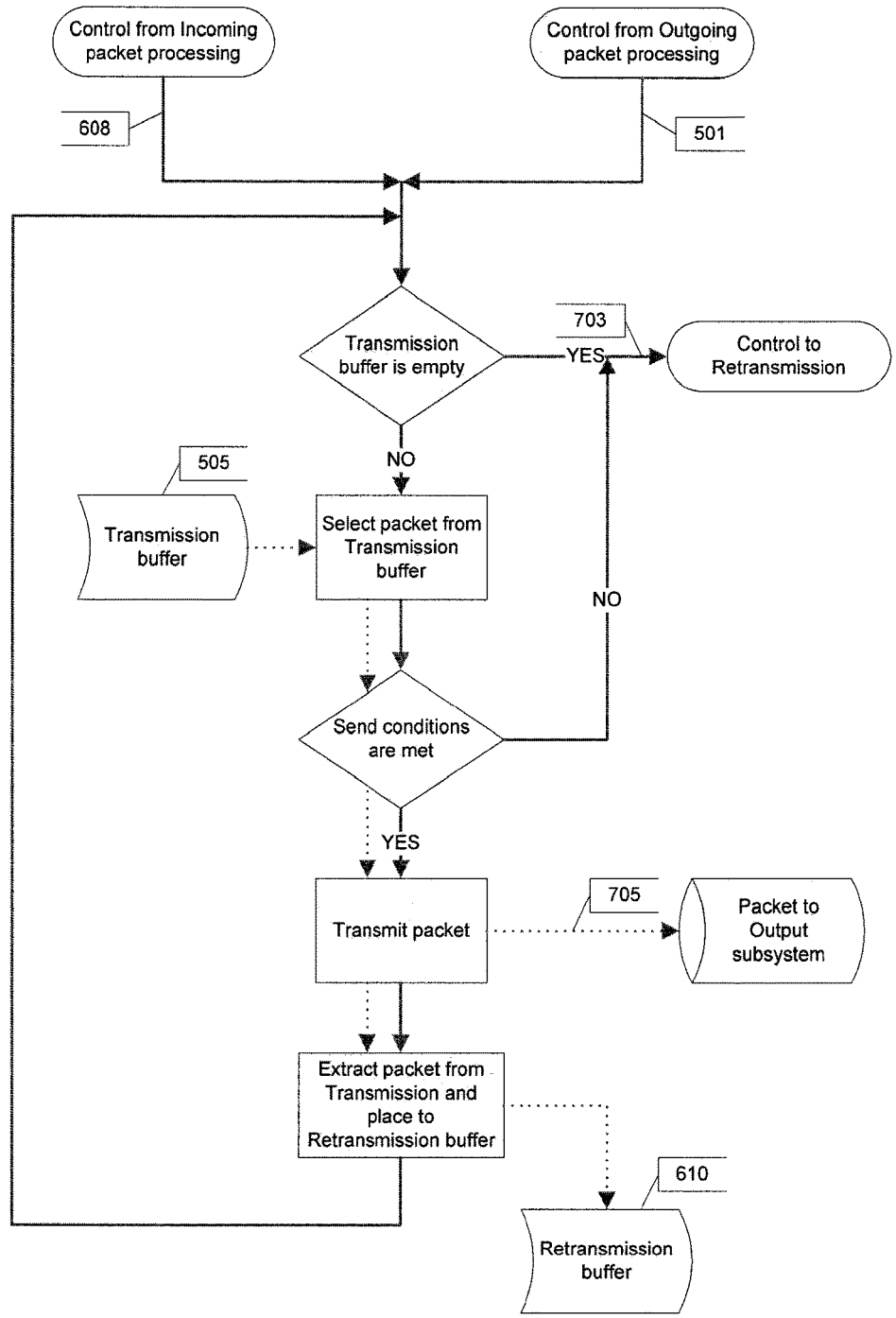
FIG. 7 illustrates the Transmission algorithm of the present invention.

FIG. 7 illustrates the Transmission algorithm. It receives control from either Outgoing (via control flow 608) or Incoming (via control flow 501) packet processing algorithm. The packets are consequently selected from Transmission buffer 505 and send conditions are checked. If the particular packet is allowed to be transmitted it is extracted from Transmission buffer 505, transmitted (by forwarding to Output subsystem via data flow 705) and then its copy is saved to Retransmission buffer 610. Once the transmission conditions are not met or Transmission buffer 505 has run empty the control is passed Retransmission algorithm (via control flow 703).

Figure 8:
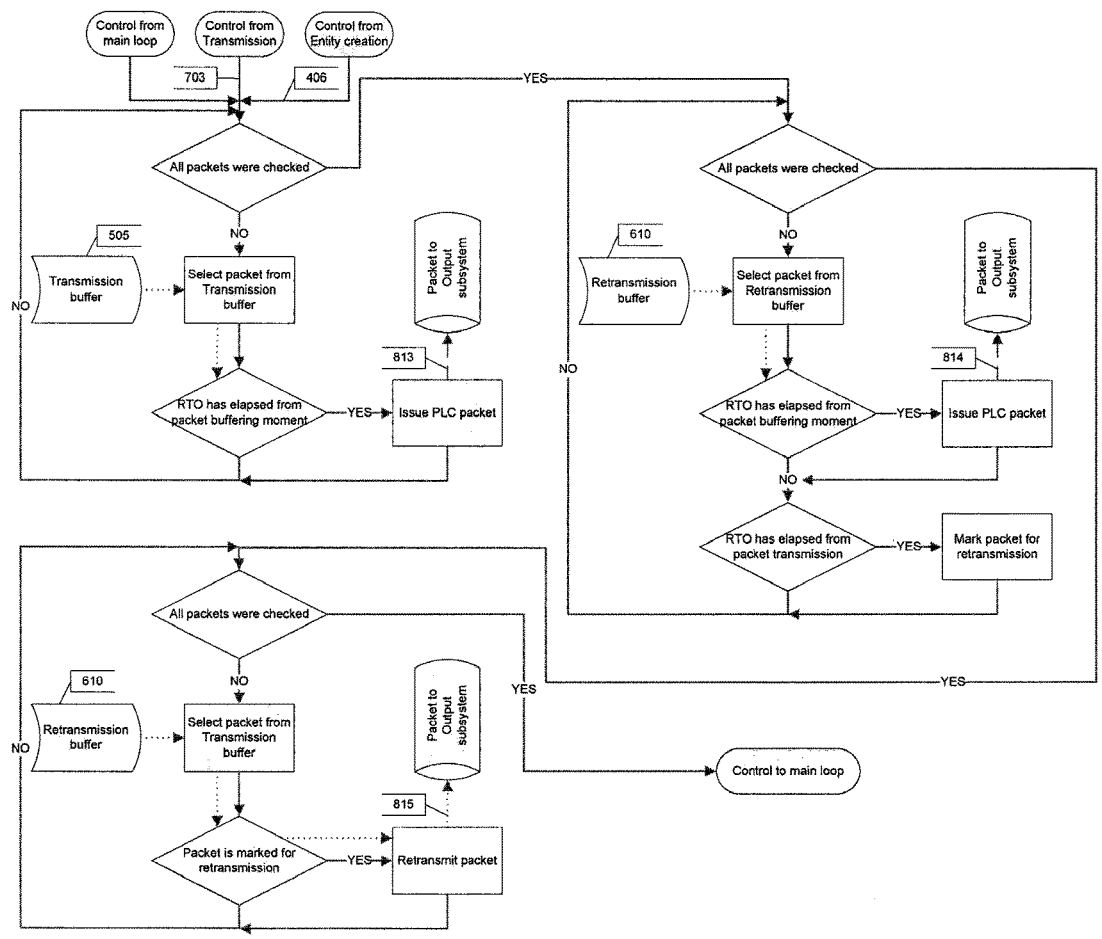
FIG. 8 illustrates the Retransmission with Timeout check and PLC algorithm of the present invention.

FIG. 8 illustrates the Retransmission with Timeout check and PLC algorithm. It receives control from either the Processing subsystem main loop (flow 800) or the Transmission algorithm (flow 703) or Connection creation algorithm (flow 406). First packets from the Transmission 505 and Retransmission 610 buffers are checked for loss concealment spoof acknowledgement necessity. If RTO has expired from the moment of particular packet buffering and the packet is not yet spoof acknowledged by the means of PSDA, the PLC acknowledgement is issued and forwarded to Output subsystem via data flow 813. The packets from Retransmission buffer 610 are simultaneously checked for RTO indicated loss. If RTO has expired from the packet transmission moment it is suspected to be lost and is marked for retransmission. Then the algorithm retransmits previously marked packets passing them to Output subsystem via data flow 814. Control is returned to the Processing subsystem main loop on retransmission completion (control flow 802).

Figure 9:
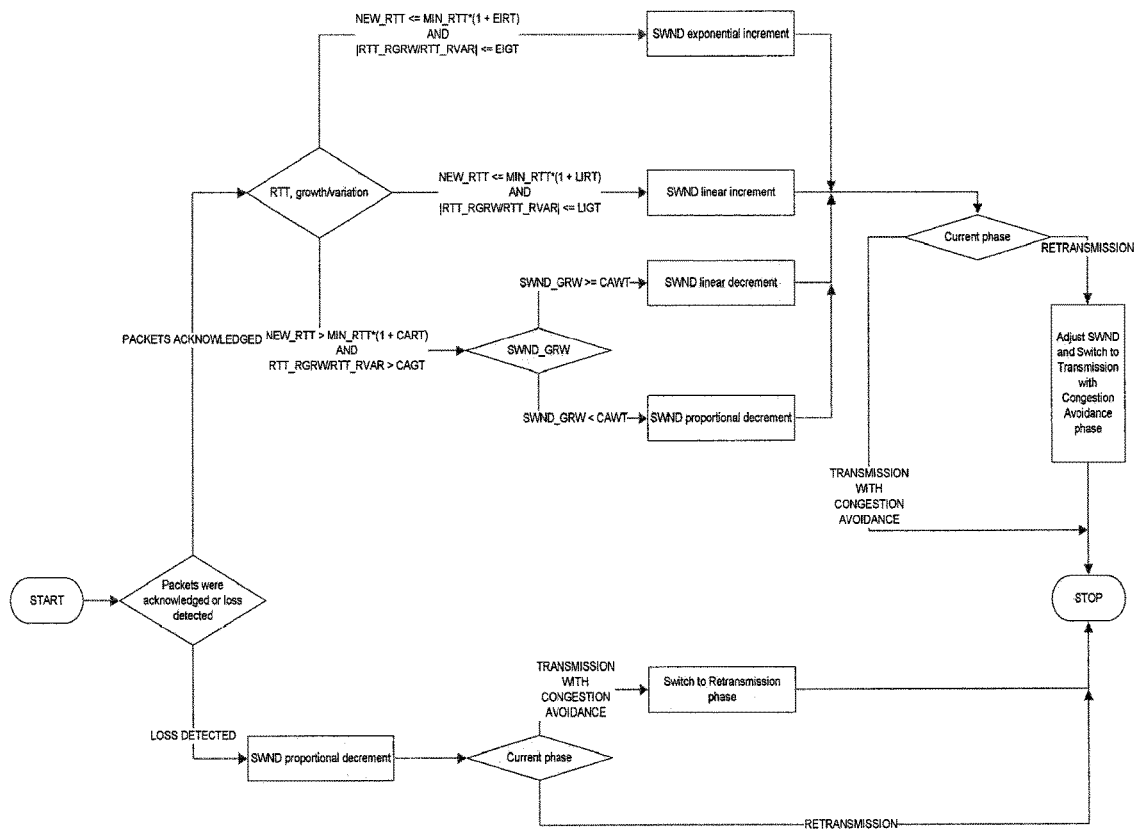
FIG. 9 illustrates the SWND calculation algorithm according to some embodiments of the invention.

FIG. 9 illustrates the SWND calculation algorithm according to some embodiments of the invention:
1. If packets were acknowledged:
   1.1. If NEW_RTT<=MIN_RTT*(1+EIRT) and |RTT_RGRW/RTT_RVAR|<=EIGT then SWND=SWND+ACK_DS*{[1−(NEW_RTT−MIN_RTT)/(MIN_RTT*EIRT)]*(1−1/EIID)+1/EIID} (SWND is increased exponentially).
   1.2. If MIN_RTT*(1+EIRT)<NEW_RTT<=MIN_RTT*(1+LIRT) and EIGT<|RTT_RGRW/RTT_RVAR|<=LIGT then SWND=SWND+(ACK_DS/SWND)*{[(1+LIRT)/(LIRT−EIRT)−(NEW_RTT−MIN_RTT)/(MIN_RTT*(LIRT−EIRT))]*(1/LIID)} (SWND is increased linearly).
   1.3. If [NEW_RTT>MIN_RTT*(1+CART) or |RTT_RGRW/RTT_RVAR|>CAGT] and SWND_GRW>=CAWT then SWND=SWND−SWND_GRW/CADD (SWND is decreased linearly).
   1.4. If [NEW_RTT>MIN_RTT*(1+CART) or |RTT_RGRW/RTT_RVAR|>CAGT] and SWND_GRW<CAWT then SWND=SWND*(MIN_RTT/NEW_RTT) (SWND is decreased proportionally).
2. If a loss was detected:
   2.1. If RTO expiration indicated loss was indicated then SWND=SWND*(MIN_RTT/RTO) (SWND is decreased proportionally).

2.2. If 3rd duplicate acknowledgement of SACK indicated loss was detected then SWND=SWND*(MIN_RTT/L_RTT) (SWND is decreased proportionally).

Figure 10:
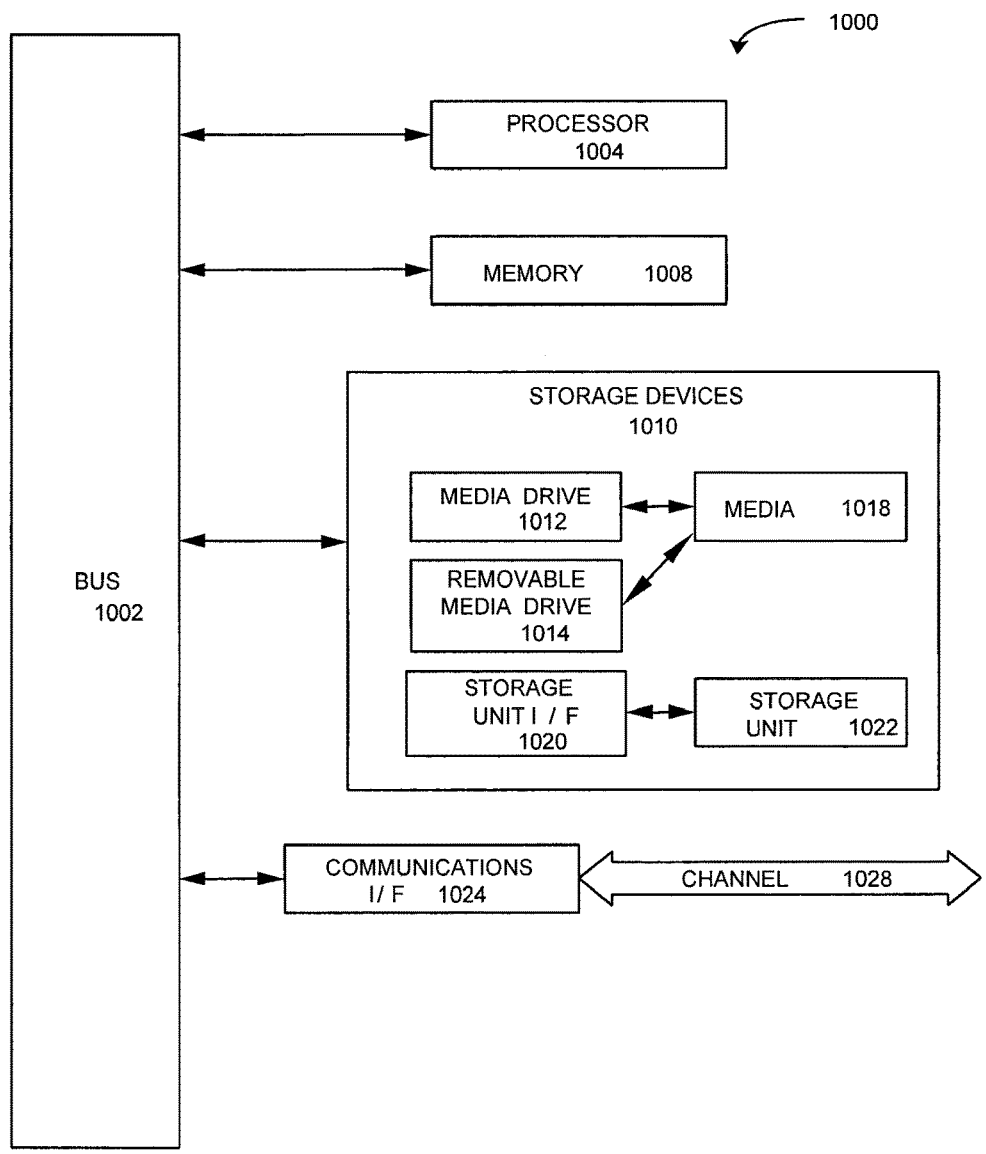
FIG. 10 illustrates a typical computing system that may be employed to implement processing functionality in embodiments of the invention.

FIG. 10 illustrates a typical computing system 1000 that may be employed to implement processing functionality in embodiments of the invention. Computing systems of this type may be used in clients and servers, for example. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special purpose processing engine such as, for example, a microprocessor, microcontroller or other control logic. In this example, processor 1004 is connected to a bus 1002 or other communication medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory ("ROM") or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1018, may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having stored therein particular computer software or data.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1022 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a USB port), a PCMCIA slot and card, etc. Software and data transferred via communications interface 1024 are in the form of signals which can be electronic, electromagnetic, optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 1008, storage device 1018, or storage unit 1022. These and other forms of computer-readable media may be involved in storing one or more instructions for use by processor 1004, to cause the processor to perform specified operations. Such instructions, generally referred to as "computer program code" (which may be grouped in the form of computer programs or other groupings), when executed, enable the computing system 1000 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1014, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization. Some exemplary embodiments of the invention are discussed above in connection with the TCP protocol. The invention is not thus limited and may be adapted for other protocols that utilize the sliding window concept.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate. It must also be noted that, as used in this specification and the appended claims, the singular forms "a," "an" and "the" include plural referents unless the context clearly dictates otherwise.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

The invention claimed is:

1. A computer readable memory comprising computer executable instructions, the instructions being configured for execution by a processor and configured to cause the processor to transmit data over a network while avoiding congestion, the transmission being performed according to a protocol that utilizes a sliding window, the instructions being further configured to cause the processor to:
   calculate the round trip times (RTT) of transmitted segments; and
   modify the size of a sending window based on the calculated RTT and the rate of change of the calculated RTT, wherein said modifications are not dependent on transmission rates;
   control the size of a sending window according to a first mode when transmitting data for the first time; and
   control the size of a sending window according to a second mode when re-transmitting already transmitted data upon determination that the already transmitted data may have been dropped by the network, and
   wherein the first and second modes of controlling the size of the sending window differ.

2. The computer readable memory of claim 1, wherein the protocol is the Transmission Control Protocol (TCP).

3. A computer readable memory comprising computer executable instructions, the instructions being configured for execution by a processor and configured to cause the processor to transmit data over a network while avoiding congestion, the transmission being performed according to a protocol that utilizes a sliding window, the instructions being further configured to cause the processor to:
   calculate the round trip times (RTT) of transmitted segments;
   determine whether a transmitted segment may have been dropped by the network;
   based on the calculated RTT and the determination of whether a segment may have been dropped, determine to operate in one of at least four states, the states indicating progressively larger levels of congestion in the network, wherein
   a first, second and third states of the at least four states are associated with progressively larger RTTs and with an absence of dropped segments, and
   a fourth state of the at least four states is associated with the determination that a segment may have been dropped;
   during operation in the first state, increase the size of a sending window exponentially;
   during operation in the second state, increase the size of a sending window linearly;
   during operation in the third state, decrease the size of the sending window linearly; and during operation in the fourth state, decrease the size of the sending window, according to a formula different than that used during the third state.

4. The computer readable memory of claim 3, wherein the protocol is the Transmission Control Protocol (TCP).

5. The computer readable memory of claim 3, wherein during operation in the fourth state, segments that have been previously transmitted and are determined to have been dropped are retransmitted.

6. The computer readable memory of claim 5, wherein the sending window size is decreased once upon entering the fourth state, and the sending window size is not decreased again until exiting from the fourth state.

7. The computer readable memory of claim 3, wherein the determination of which state to operate in is based on a difference between the last calculated RTT (NEW_RTT) and a predetermined MIN_RTT value indicating the smallest RTT recently calculated.

8. The computer readable memory of claim 7, further including calculating the current growth of RTT and wherein the determination of which state to operate in is at least partially based on the current growth of RTT.

9. The computer readable memory of claim 8, wherein the current growth of RTT is based on a smoothed running average of the changes between consecutive RTTs over a predefined number of acknowledgements.

10. The computer readable memory of claim 8, wherein the at least four states include a fifth state that indicates a negative current growth of RTT while there is no determination that a segment may have been dropped and the instructions are further configured to cause the processor to:
    during operation in the fifth state, keep the sending window constant.

11. The computer readable memory of claim 3, wherein the instructions are further configured to cause the processor to:
    during operation in the third state, determine whether congestion is primarily caused by data sent by the processor, or by data sent by other computers or entities on the network, and using two different formulas for decreasing the sending window based on said determination.

12. A computing system connected to a network, the computing system including a processor and a memory, the memory including a plurality of instructions the instructions being configured to cause the processor to transmit data over a network while avoiding congestion, the transmission being performed according to a protocol that utilizes a sliding window, the instructions further causing the processor to perform the steps of:
    calculating the round trip times (RTT) of transmitted segments; and
    modifying the size of a sending window based on the calculated RTT and the rate of change of the calculated RTT, wherein said modifications are not dependent on transmission rates;
    controlling the size of a sending window according to a first mode when transmitting data for the first time; and
    controlling the size of a sending window according to a second mode when re-transmitting already transmitted data upon determination that the already transmitted data may have been dropped by the network,
    wherein the first and second modes of controlling the size of the sending window differ.

13. The computing system of claim 12, wherein the protocol is the Transmission Control Protocol (TCP).

14. A computing system connected to a network, the computing system including a processor and a memory, the memory including a plurality of instructions the instructions being configured to cause the processor to transmit data over a network while avoiding congestion, the transmission being performed according to a protocol that utilizes a sliding window, the instructions further causing the processor to perform the steps of:
 calculating the round trip times (RTT) of transmitted segments;
 determining whether a transmitted segment may have been dropped by the network;
 based on the calculated RTT and the determination of whether a segment may have been dropped,
 determining to operate in one of at least four states, the states indicating progressively larger levels of congestion in the network, wherein
 a first, second and third states of the at least four states are associated with progressively larger RTTs and with an absence of dropped segments, and
 a fourth state of the at least four states is associated with the determination that a segment may have been dropped;
 during operation in the first state, increasing the size of a sending window exponentially; during operation in the second state, increasing the size of a sending window linearly; during operation in the third state, decreasing the size of the sending window linearly; and during operation in the fourth state, decreasing the size of the sending window, according to a formula different than that used during the third state.

15. The computing system of claim 14, wherein the protocol is the Transmission Control Protocol (TCP).

16. The computing system of claim 14, wherein during operation in the fourth state, segments that have been previously transmitted and are determined to have been dropped are retransmitted.

17. The computing system of claim 16, wherein all retransmission of segments that have been determined to have been dropped is performed during operation in the fourth state.

18. The computing system of claim 16, wherein the sending window size is decreased once upon entering the fourth state, and the sending window size is not decreased again until exiting from the fourth state.

19. The computing system of claim 14, wherein the determination of which state to operate in is based on a difference between the last calculated RTT (NEW_RTT) and a predetermined MIN_RTT value indicating the smallest RTT recently calculated.

20. The computing system of claim 19, wherein the instructions further cause the processor to perform the step of calculating the current growth of RTT and wherein the determination of which state to operate in is at least partially based on the current growth of RTT.

21. The computing system of claim 20, wherein the current growth of RTT is based on a smoothed running average of the changes between consecutive RTTs over a predefined number of acknowledgements.

22. The computing system of claim 20, wherein the at least four states include a fifth state that indicates a negative current growth of RTT while there is no determination that a segment may have been dropped and the instructions are further configured to cause the processor to perform the step of:
 during operation in the fifth state, keeping the sending window constant.

23. The computing system of claim 14, wherein the instructions are further configured to cause the processor to perform the step of:
 during operation in the third state, determining whether congestion is primarily caused by the operation of the processor, or by data sent by other computers or entities on the network, and using two different formulas for decreasing the sending window based on said determination.

24. A method for transmitting data over a network by a computer while avoiding congestion, the transmission being performed according to a protocol that utilizes a sliding window, in particular according to the Transmission Control Protocol (TCP), and in which a receiving side advertises a receiver window size (RWND), said sliding window being utilized preferably at least in a congestion avoidance phase and in a retransmit phase, the method comprising the steps of:
 calculating the round trip times (RTT) of transmitted segments;
 modifying the size of a sending window (SWND) based on a currently calculated RTT value wherein, in particular during said congestion avoidance phase, said window size modifications are not limited by RWND and let SWND grow beyond RWND to allow faster transmission rates;
 determining whether a transmitted segment may have been dropped by the network;
 based on the calculated RTT and the determination of whether a segment may have been dropped, determining to operate in one of at least four states, the states indicating progressively larger levels of congestion in the network, wherein
 a first, second and third states of the at least four states are associated with progressively larger RTTs and with an absence of dropped segments, and in particular with said congestion avoidance phase, and
 a fourth state of the at least four states is associated with the determination that a segment may have been dropped, and in particular with said retransmit phase;
 during operation in the first state, increasing the size of a sending window exponentially;
 during operation in the second state, increasing the size of a sending window linearly;
 during operation in the third state, decreasing the size of the sending window linearly; and
 during operation in the fourth state, in particular in said retransmit phase, decreasing the size of the sending window, according to a formula different than that used during the third state, in particular according to a rule that is different from the rules used in said congestion avoidance phase.

25. The method of claim 24, wherein during operation in the fourth state, segments that have been previously transmitted and are determined to have been dropped are retransmitted, wherein preferably all retransmission of segments that have been determined to have been dropped is performed during operation in the fourth state, and wherein further preferably the sending window size is decreased once upon entering the fourth state and not decreased again until exiting from the fourth state.

26. The method of claim 24, wherein the determination of which state to operate in is based on a difference between the last calculated RTT (NEW RTT) and a predetermined MIN RTT value indicating the smallest RTT recently calculated, preferably further including calculating the current growth of RTT, in particular calculating the current growth of RTT based on a smoothed running average of the changes between consecutive RTTs over a predefined number of acknowledgements, the determination of which state to operate in being at least partially based on the current growth of RTT.

27. The method of claim 26, wherein said states include a fifth state that indicates a negative current growth of RTT while there is no determination that a segment may have been dropped and the method further includes the step of:
during operation in the fifth state, keeping the sending window constant.

28. The method of claim 24 further comprising, during operation in the third state, determining whether congestion is primarily caused by the operation of the method of claim 24, or by data sent by other computers or entities on the network, and using two different formulas for decreasing the sending window based on said determination.

29. The method of claim 24, wherein the modifying of the size of the sending window is further based on the variation of the calculated RTT over a period of time.

30. The method of claim 24, wherein the modifying of the size of the sending window comprises, during said congestion avoidance phase, increasing the size of the sending window exponentially or linearly if transmission rate is above or equal to a threshold that depends on a currently calculated RTT value and decreasing the size of the sending window if transmission rate is below that threshold.

31. A computing system connected to a network, the computing system including a processor and a memory, the memory including a plurality of instructions, the instructions being configured to cause the processor to transmit data over a network while avoiding congestion, the transmission being performed according to a protocol that utilizes a sliding window, in particular according to the Transmission Control Protocol (TCP), and in which a receiving side advertises a receiver window size (RWND), said sliding window being utilized preferably at least in a congestion avoidance phase and in a retransmit phase, the instructions further causing the processor to perform the steps of:
calculating the round trip times (RTT) of transmitted segments;
modifying the size of a sending window (SWND) based on a currently calculated RTT value wherein, in particular during said congestion avoidance phase, said window size modifications are not limited by RWND and let SWND grow beyond RWND to allow faster transmission rates;
determining whether a transmitted segment may have been dropped by the network;
based on the calculated RTT and the determination of whether a segment may have been dropped, determining to operate in one of at least four states, the states indicating progressively larger levels of congestion in the network, wherein
a first, second and third states of the at least four states are associated with progressively larger RTTs and with an absence of dropped segments, and in particular with said congestion avoidance phase, and
a fourth state of the at least four states is associated with the determination that a segment may have been dropped, and in particular with said retransmit phase;
during operation in the first state, increasing the size of a sending window exponentially;
during operation in the second state, increasing the size of a sending window linearly;
during operation in the third state, decreasing the size of the sending window linearly; and
during operation in the fourth state, in particular in said retransmit phase, decreasing the size of the sending window, according to a formula different than that used during the third state, in particular according to a rule that is different from the rules used in said congestion avoidance phase.

32. The computing system of claim 31, wherein during operation in the fourth state, segments that have been previously transmitted and are determined to have been dropped are retransmitted, wherein preferably all retransmission of segments that have been determined to have been dropped is performed during operation in the fourth state, and wherein further preferably the sending window size is decreased once upon entering the fourth state and not decreased again until exiting from the fourth state.

33. The computing system of claim 31, wherein the determination of which state to operate in is based on a difference between the last calculated RTT (NEW RTT) and a predetermined MIN RTT value indicating the smallest RTT recently calculated, and wherein the instructions preferably further cause the processor to perform the step of calculating the current growth of RTT, in particular calculating the current growth of RTT based on a smoothed running average of the changes between consecutive RTTs over a predefined number of acknowledgements, the determination of which state to operate being at least partially based on the current growth of RTT.

34. The computing system of claim 33, wherein said states include a fifth state that indicates a negative current growth of RTT while there is no determination that a segment may have been dropped and the instructions are further configured to cause the processor to perform the step of:
during operation in the fifth state, keeping the sending window constant.

35. The computing system of claim 31, wherein the instructions are further configured to cause the processor to perform the step of:
during operation in the third state, determining whether congestion is primarily caused by the operation of the processor, or by data sent by other computers or entities on the network, and using two different formulas for decreasing the sending window based on said determination.

36. The computing system of claim 31, wherein the modifying of the size of the sending window is further based on the variation of the calculated RTT over a period of time.

37. The computing system of claim 31, wherein the modifying of the size of the sending window comprises, during said congestion avoidance phase, increasing the size of the sending window exponentially or linearly if transmission rate is above or equal to a threshold that depends on a currently calculated RTT value and decreasing the size of the sending window if transmission rate is below that threshold.

* * * * *